(12) United States Patent
Fujikawa et al.

(10) Patent No.: US 9,451,198 B2
(45) Date of Patent: Sep. 20, 2016

(54) DISPLAY DEVICE

(71) Applicant: Funai Electric Co., Ltd., Daito, Osaka (JP)

(72) Inventors: Akihiro Fujikawa, Osaka (JP); Yuki Kita, Osaka (JP); Akira Yokawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 252 days.

(21) Appl. No.: 14/224,505

(22) Filed: Mar. 25, 2014

(65) Prior Publication Data

US 2014/0307171 A1    Oct. 16, 2014

(30) Foreign Application Priority Data

Apr. 12, 2013  (JP) ................. 2013-084133

(51) Int. Cl.
  *H04N 5/64*  (2006.01)
  *H04N 5/77*  (2006.01)
  *G06F 1/16*  (2006.01)

(52) U.S. Cl.
  CPC .............. *H04N 5/64* (2013.01); *G06F 1/1601* (2013.01); *G06F 1/1605* (2013.01); *G06F 2200/1612* (2013.01)

(58) Field of Classification Search
  CPC .................. H04N 5/64; G06F 1/1601; G06F 2200/1612

USPC .................. 348/836; 386/358, 361, 362, 360
See application file for complete search history.

(56) References Cited

U.S. PATENT DOCUMENTS 8,514,364 B2 *  8/2013  Mikubo ............ G02F 1/133308
                                                349/161
2002/0008804 A1   1/2002  Ogawa et al.

FOREIGN PATENT DOCUMENTS

| EP | 2157474 A1 | 2/2010 |
| EP | 2312384 A1 | 4/2011 |
| EP | 2390692 A1 | 11/2011 |
| JP | 02007171340 A * | 7/2007 |
| JP | 2012-078546 A | 4/2012 |

OTHER PUBLICATIONS

Extended European Search Report of the corresponding European Application No. 14162178.9, dated Jul. 1, 2014.

* cited by examiner

*Primary Examiner* — Robert Chevalier
(74) *Attorney, Agent, or Firm* — Global IP Counselors, LLP

(57) ABSTRACT

A display device includes a display cell, a metal housing, a light source, a reflecting member, and a power supply circuit board. The housing supports the display cell from a rear side of the display device. The light source is attached to the housing. The light source is configured to emit light toward the display cell. The reflecting member is disposed between the display cell and the housing. The reflecting member is configured to reflect the light emitted from the light source toward the display cell. The power supply circuit board is disposed between the reflecting member and the housing.

12 Claims, 11 Drawing Sheets

DISPLAY DEVICE

CROSS-REFERENCE TO RELATED APPLICATIONS

This application claims priority to Japanese Patent Application No. 2013-084133 filed on Apr. 12, 2013. The entire disclosure of Japanese Patent Application No. 2013-084133 is hereby incorporated herein by reference.

BACKGROUND

1. Field of the Invention

This invention generally relates to a display device. More specifically, this invention relates to a display device such as a liquid crystal display device, a liquid crystal television set, or the like.

2. Background Information

Generally, liquid crystal display devices, liquid crystal television sets, and other such display devices are well-known in the art (see Japanese Unexamined Patent Application Publication No. 2012-78546 (Patent Literature 1), for example). With this display device, a power supply circuit board is disposed on the rear face side of the display device. The power supply circuit board is covered by a plastic rear cover such that it is invisible from the rear.

With another display device, a power supply circuit board and an audio/video processing board are fixed to a rear frame with screws or the like. When these boards have been fixed, a plastic rear cover is attached to the rear frame such that the power supply circuit board and the audio/video processing board are covered by the plastic rear cover. A speaker holder is attached to the rear frame, and the speaker is attached to the speaker holder. With this configuration, if the power supply circuit board should catch fire, the flames will burn the plastic rear cover, which is a problem from the standpoint of fireproofing.

With yet another display device, a power supply circuit board is fixed to a rear frame with screws or the like. The sides and rear of the power supply circuit board are covered and fixed by a metal panel. In this state, a plastic rear cover is attached to the rear frame such that the power supply circuit board is covered by the rear cover. A speaker is also attached to the rear frame. Since the power supply circuit board is covered by the metal panel, fireproof performance can be enhanced.

SUMMARY

With the display device with the metal panel, the power supply circuit board is covered by the panel in order to improve fireproof performance. However, it has been discovered that the panel makes the display device thicker and heavier, and also increase the cost of the display device.

One aspect is to provide a display device which is made thinner and has a fireproof characteristics.

In view of the state of the known technology, a display device is provided that includes a display cell, a metal housing, a light source, a reflecting member, and a power supply circuit board. The housing supports the display cell from a rear side of the display device. The light source is attached to the housing. The light source is configured to emit light toward the display cell. The reflecting member is disposed between the display cell and the housing. The reflecting member is configured to reflect the light emitted from the light source toward the display cell. The power supply circuit board is disposed between the reflecting member and the housing.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Specifically, the numerical values, shapes, materials, constituent elements, layout relations and connection modes of the constituent elements, and so forth given in the following descriptions of the embodiments are provided for illustrating only, and not for the purpose of limiting the invention. Thus, of the constituent elements in the following embodiments, those not mentioned in an independent claim are not necessarily essential to achieving the advantage the invention, but are provided for illustrating the embodiment.

Figure 1:
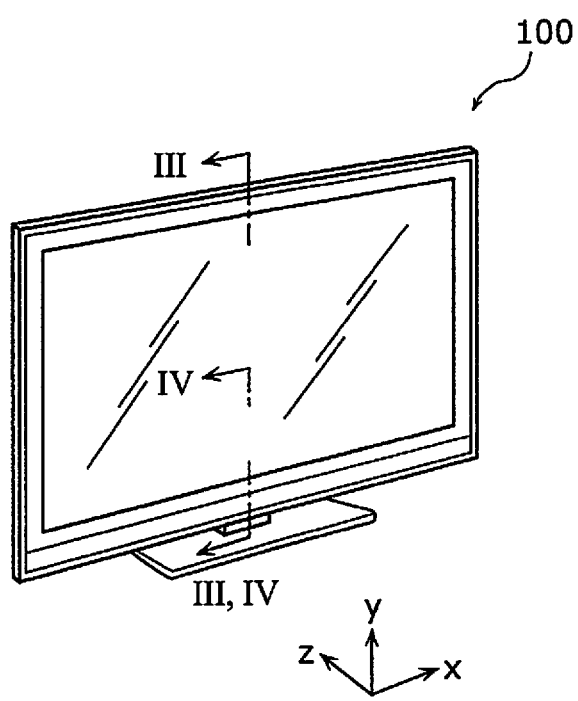
FIG. 1 is a perspective view of a display device in accordance with a first embodiment.
Figure 2:
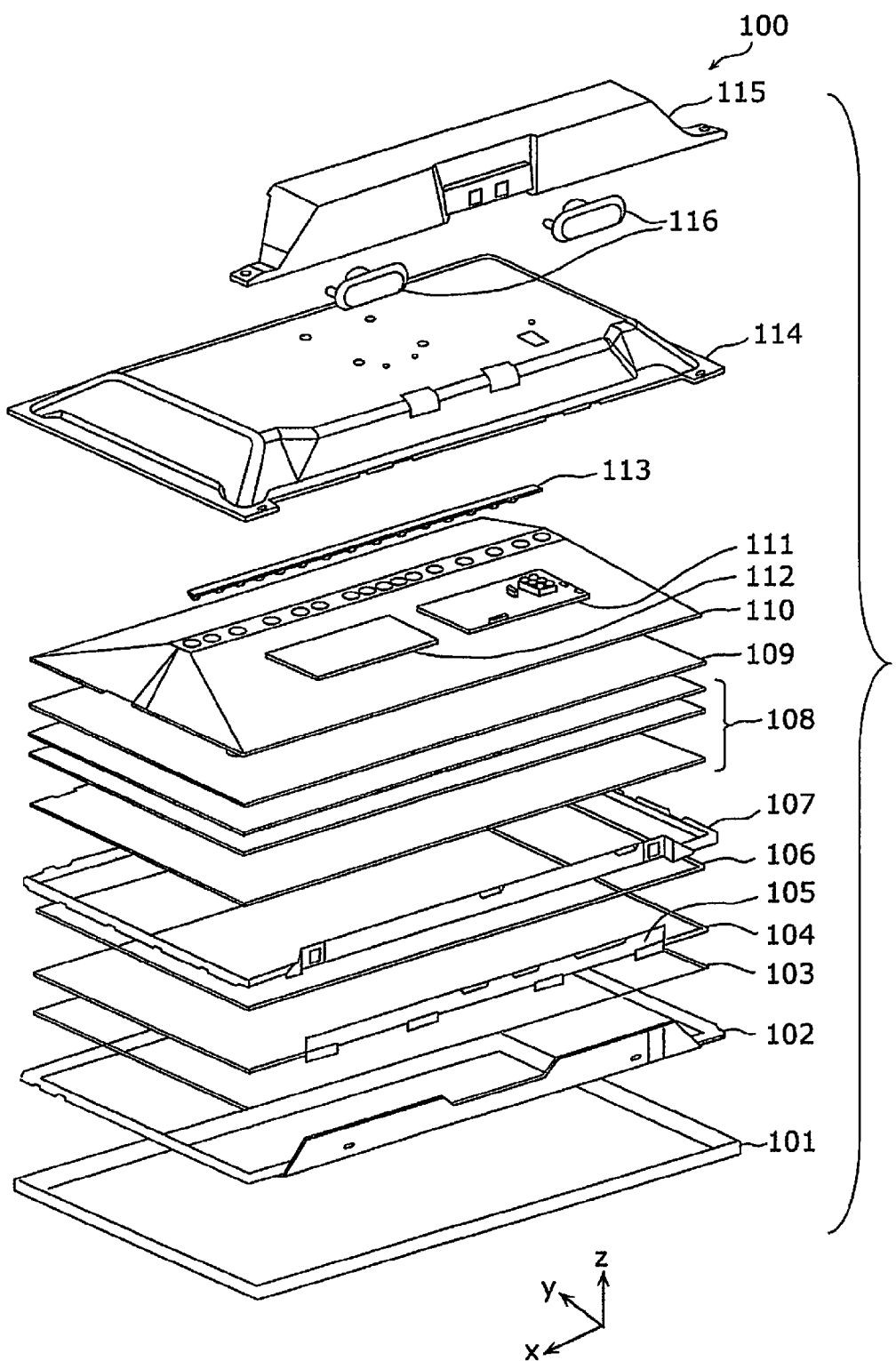
FIG. 2 is an exploded perspective view of the display device as seen from the rear.

Referring initially to FIGS. 1 and 2, a display device 100 is illustrated in accordance with a first embodiment. This display device 100 is a liquid crystal display device, a liquid crystal television set, or the like.

FIG. 2 is an exploded perspective view of the display device 100 as seen from the rear. The display device 100 includes a front cabinet 101, a bezel 102, a cushioning material 103, a liquid crystal cell or panel 104 (e.g., a display cell), a relay board 105, a cushioning material 106, a cell guide 107, an optical sheet 108, a diffuser plate 109, a reflector sheet 110 (e.g., a reflecting member), an audio/video processing board 111 (e.g., a circuit board, an audio processing board, and a video processing board), a power supply circuit board 112, an LED bar 113 (e.g., a light source), a rear frame 114 (e.g., a housing), a speaker holder 115, and a speaker 116.

The LED bar 113 is an example of a light source. The LED bar 133 includes a plurality of LEDs (Light Emitting Diodes) aligned in the x direction. The LED bar 133 is attached to the rear frame 114, and emits light toward the liquid crystal cell 104.

The reflector sheet 110 is an example of a reflecting member. The reflector sheet 110 is attached between the liquid crystal cell 104 and the rear frame 114. The reflector sheet 110 reflects the light emitted from the LED bar 113 toward the liquid crystal cell 104. Specifically, the reflector sheet 110 has a bottom portion 110a that is disposed on a rear face 114a of the rear flame 114. In the illustrated embodiment, the audio/video processing board 111 and the power supply circuit board 112 are disposed on a front side of the display device 100 relative to the bottom portion 110a of the reflecting sheet 110.

The audio/video processing board 111 is a circuit board used for processing video signals and audio signals. The audio/video processing board 111 is disposed between the reflector sheet 110 and the rear frame 114. The audio/video processing board 111 is fixedly attached to the rear face 114a of the rear frame 114 by screws or other such fastening members. In the illustrated embodiment, the audio/video processing board 111 is formed as a single board. However, of course, the audio/video processing board 111 can include an audio processing board and a video processing board that are independently formed as separate boards.

The power supply circuit board 112 is a circuit board for supplying power to the various processors of the display device 100, such as the audio/video processing board 111 and the LED bar 113. The power supply circuit board 112 is disposed between the reflector sheet 110 and the rear frame 114. The power supply circuit board 112 is fixedly attached to the rear face 114a of the rear frame 114 by screws or other such fastening members.

The relay board 105 is wired via a COF (chip-on-film) to the liquid crystal cell 104. The relay board 105 is wired to the audio/video processing board 111. The relay board 105 is a circuit board used for relaying video signals outputted from the audio/video processing board 111 to the liquid crystal cell 104.

The rear frame 114 (e.g., the housing of the display device 100) is a metal frame. The rear frame 114 forms the aesthetic part of the outside of the display device 100.

The speaker holder 115 is attached to the rear frame 114. The speaker 116 is attached to the speaker holder 115. The speaker 116 is wired to the audio/video processing board 111.

Figure 3:
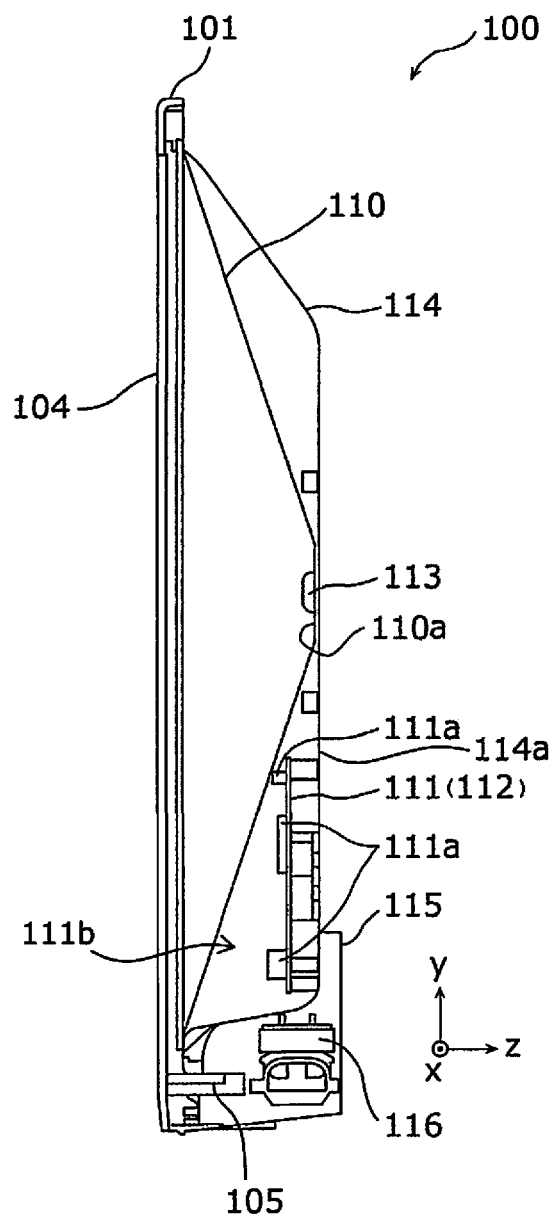
FIG. 3 is a cross sectional view of the display device taken along III-III line in FIG. 1.

FIG. 3 is a cross sectional view of the display device 100 taken along line in FIG. 1.

The reflector sheet 110 is disposed near the LED bar 113, that is, on the rear frame 114 side in the position of the LED bar 113. The reflector sheet 110 is bent such that it is inclined from this position toward the upper and lower ends of the display device 100. Therefore, there is a gap between the reflector sheet 110 and the rear frame 114 at the upper and lower ends of the display device 100. The audio/video processing board 111 is disposed in this gap, and is attached by screws or the like to the rear frame 114. With the audio/video processing board 111, integrated circuits (ICs), transistors, and other such electronic parts 111a are disposed on the front face side of the display device 100. The power supply circuit board 112 is also disposed in the above-mentioned gap, and is attached by screws or the like to the rear frame 114.

Figure 4:
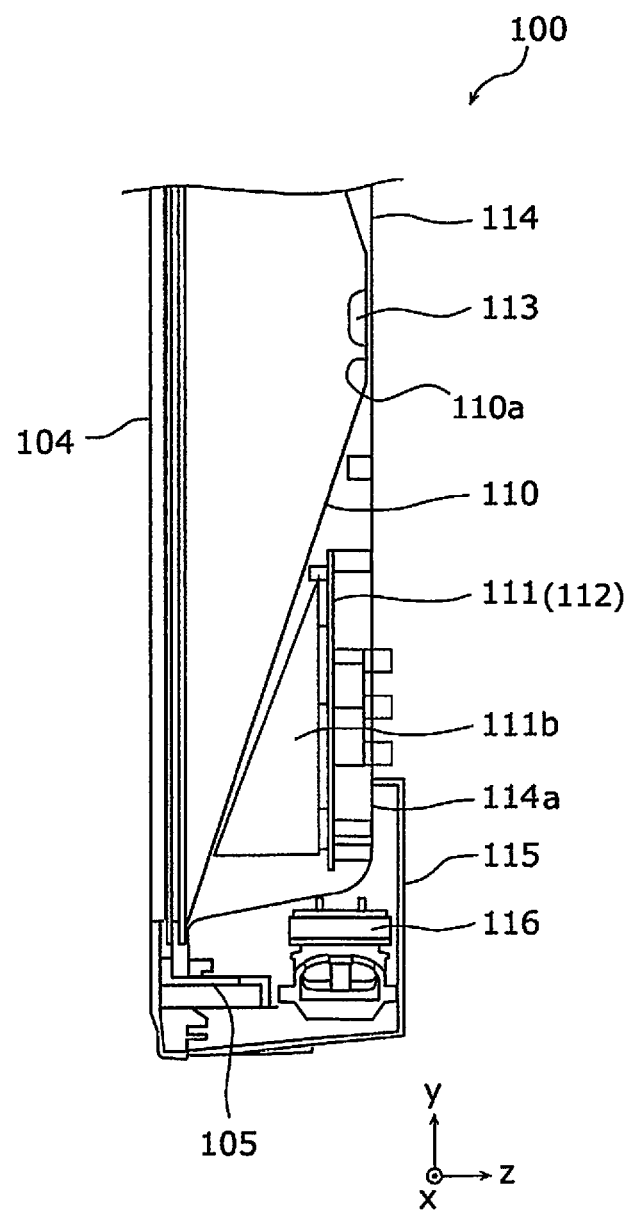
FIG. 4 is a partial cross sectional view of the display device taken along IV-IV line in FIG. 1, illustrating the layout of electronic parts attached to an audio/video processing board.

FIG. 4 is a partial cross sectional view of the display device 100 taken along IV-IV line in FIG. 1. FIG. 4 illustrates the layout of electronic parts 111a attached to the audio/video processing board 111. The reflector sheet 110 is inclined toward the lower end of the display device 100. Specifically, the reflecting sheet 110 is configured such that a distance between the reflecting sheet 110 and the rear face 114a of the rear frame 114 increases as moving towards a lower end of the display device 100 to define a gap portion 111b (e.g., a housing space) between the reflecting sheet 110 and the rear flame 114. Accordingly, the gap portion 111b that widens toward the lower end of the display device 100 is produced between the reflector sheet 110 and the audio/video processing board 111. In the illustrated embodiment, the audio/video processing board 111 and the power supply circuit board 112 are disposed within the gap portion 111b inside the rear frame 114. Thus, the electronic parts 111a that are as tall as the thickness of the lower end of the display device 100 can be disposed by bending the reflector sheet 110 such that it inclines toward the lower end of the display device 100. The same applies to the power supply circuit board 112, allowing electronic parts that are as tall as the thickness of the lower end of the display device 100 to be disposed. When the audio/video processing board 111 or the power supply circuit board 112 is attached to the upper end of the display device 100, electronic parts that are as tall as the thickness of the upper end of the display device 100 can be disposed.

Referring now to FIG. 3, the speaker 116 is attached on the outside of the rear frame 114 and on the inside of the speaker holder 115. The relay board 105 is also attached on the outside of the rear frame 114 and on the inside of the speaker holder 115.

Figure 5:
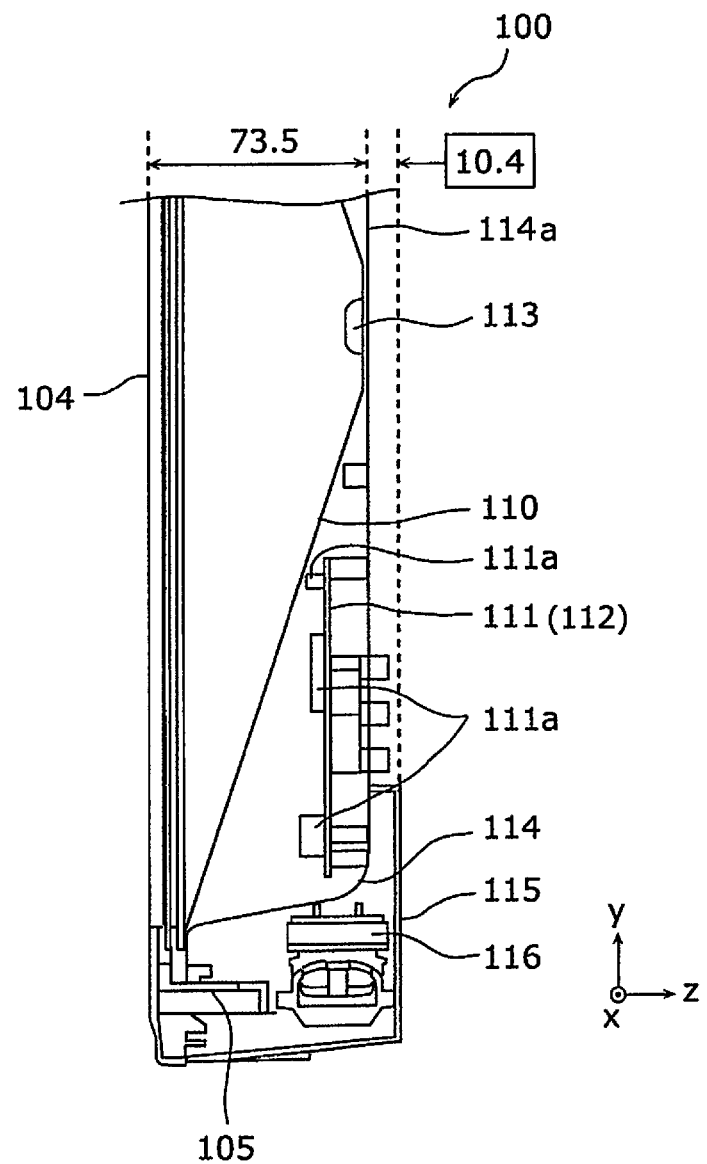
FIG. 5 is a partial cross sectional view of the display device, illustrating the thickness of the display device.
Figure 6:
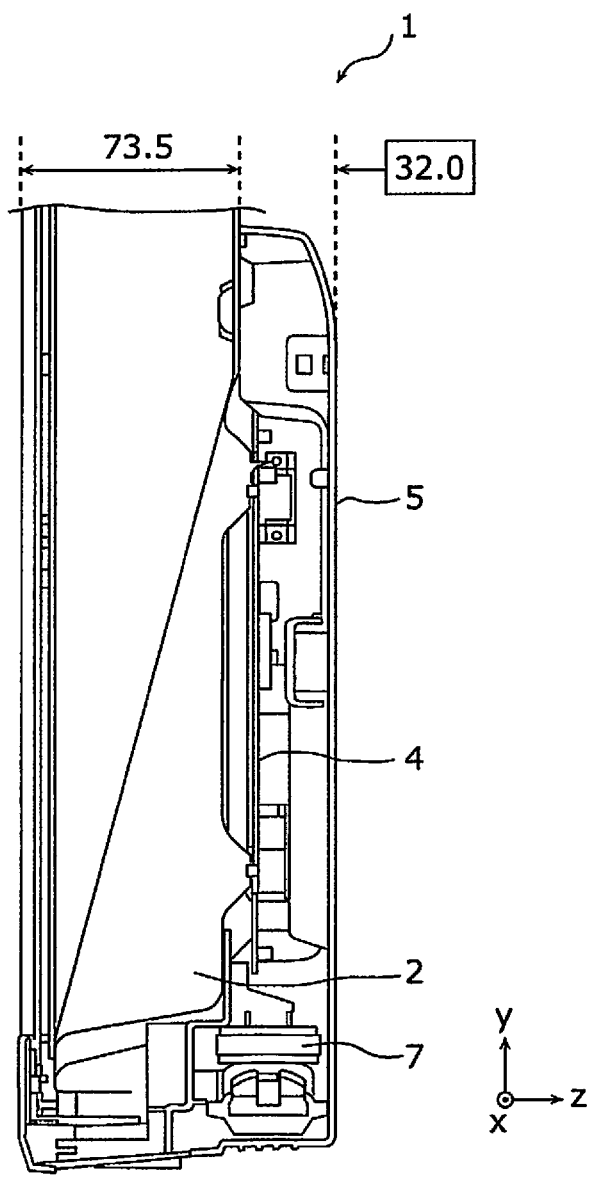
FIG. 6 is a partial cross sectional view of a display device in accordance with a comparative example, illustrating the thickness thereof.

FIG. 5 is a partial cross sectional view of the display device 100 at the same location as FIG. 4. FIG. 5 illustrates the thickness of the display device 100. FIG. 6 is a partial cross sectional view of a display device 1 in accordance with a comparison example. FIG. 6 illustrates the thickness of the display device 1. As shown in FIG. 6, with the display device 1 in accordance with the comparison example, a circuit board 4 is fixed to a rear frame 2 outside (or rear side) of the rear frame 2. A plastic rear cover 5 is attached to the rear frame 2 on the rear side of the rear frame 2 such that the circuit board 4 is covered by the rear cover 5. The speaker 7 is attached to the rear frame 2. As shown in FIG. 5, the thickness of the display device 100 is the sum of adding the 10.4 mm length of the bulging portion of the speaker holder 115 to the 73.5 mm distance from the front face of the display device 100 to the rear frame 114. In contrast, as shown in FIG. 6, the thickness of the display device 1 is the sum of adding the 32.0 mm distance from a rear frame 2 to a rear cover 5, to the 73.5 mm distance from the front face of the display device 1 to the rear frame 2. The display device 100 does not use of a plastic rear cover that covers the audio/video processing board 111 or the power supply circuit board 112 from the rear side of the display device 100, although it has the bulging portion of the speaker holder 115. Accordingly, the display device 100 can be thinner than the display device 1 in accordance with the comparative example.

Figure 7:
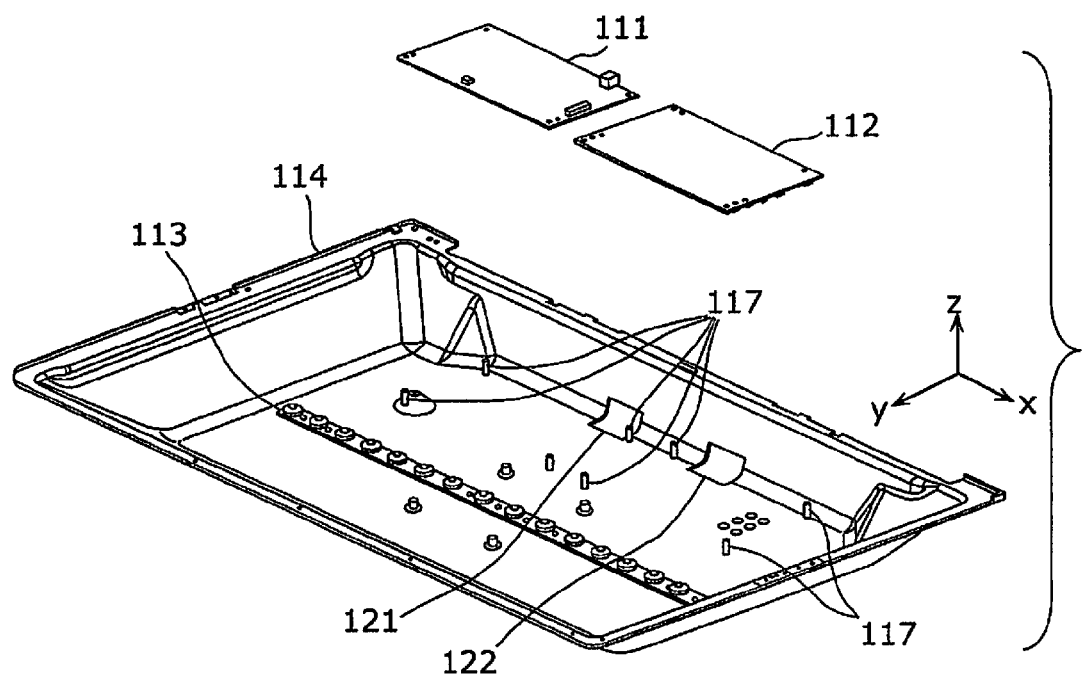
FIG. 7 is a diagram illustrating a method for attaching the audio/video processing board and a power supply circuit board to a rear frame.
Figure 8:
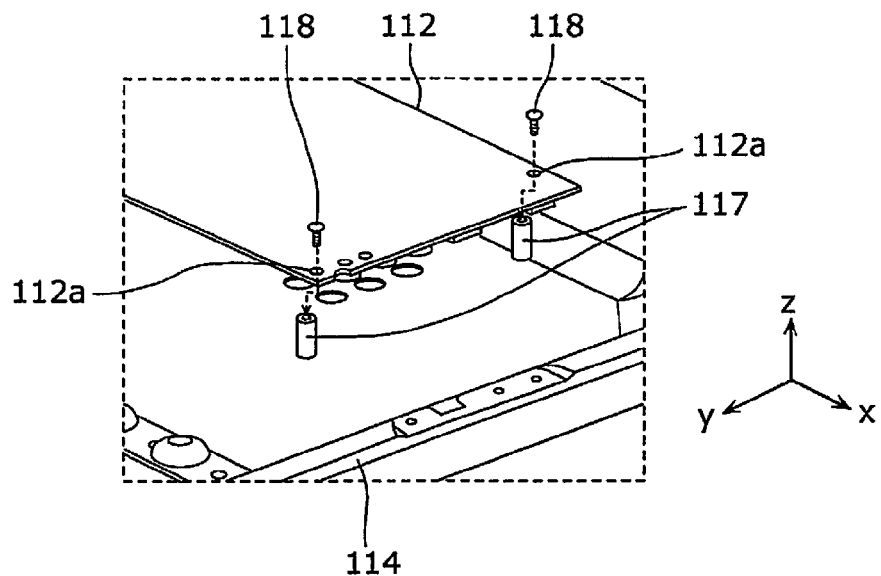
FIG. 8 is a detailed diagram illustrating an attachment of the power supply circuit board and the rear frame at an attachment portion of the power supply circuit board.

FIG. 7 is a diagram illustrating a method for attaching the audio/video processing board 111 and the power supply circuit board 112 to the rear frame 114. FIG. 8 is a detailed diagram illustrating an attachment of the power supply circuit board 112 and the rear frame 114 at the attachment portion of the power supply circuit board 112.

A plurality of metal studs 117 each having a threaded hole are crimped to the inner face of the rear frame 114. The studs 117 can instead be welded to the rear frame 114.

The power supply circuit board 112 is disposed on the studs 117. Screws 118 are threaded into the threaded holes of the studs 117 through openings 112*a* provided to the power supply circuit board 112, thereby fixing the power supply circuit board 112 to the rear frame 114. The screws 118 have male threads, while the studs 117 have female threads in the illustrated embodiment.

Figure 9:
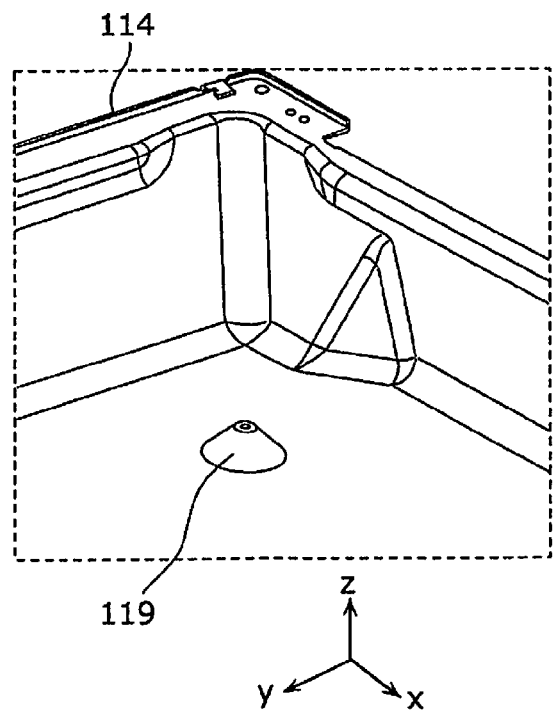
FIG. 9 is a partial perspective view of the rear frame, illustrating a screw receptacle formed by drawing.
Figure 10:
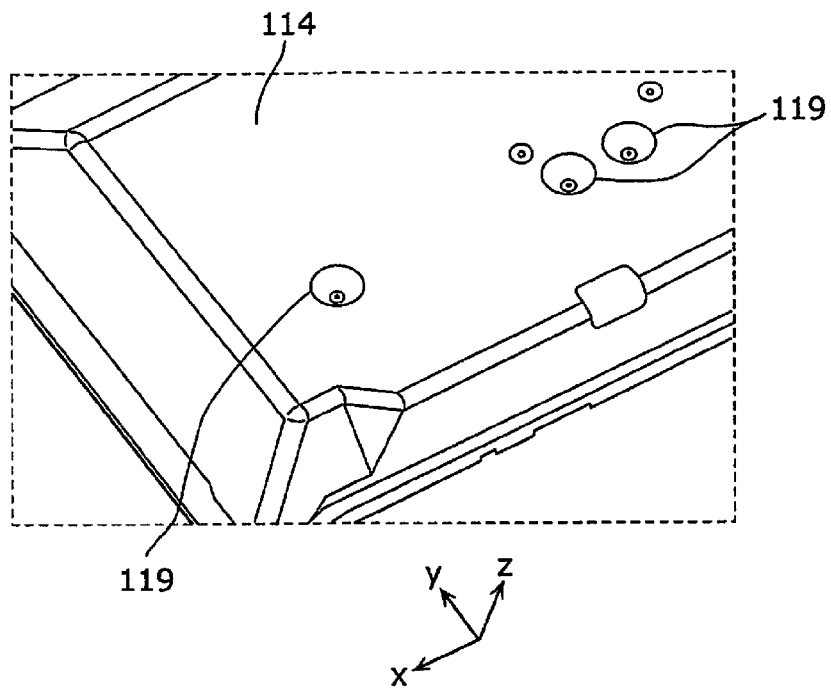
FIG. 10 is a partial perspective view of the rear frame, illustrating screw receptacles formed by drawing.

It is also possible to form receptacles 119 for the screws 118 by drawing, instead of using the studs 117. FIGS. 9 and 10 show an example of forming the receptacles 119 for the screws 118 by drawing. As shown in FIG. 10, the receptacles 119 formed by drawing appear as recesses on the rear face side of the display device 100. These recesses are not produced when the studs 117 are attached to the rear frame 114. Therefore, from the standpoint of the aesthetics of the display device 100, it is preferable to fasten the screws 118 by using the studs 117. That is, using the studs 117 makes the rear face of the display device 100 more aesthetically pleasing.

Figure 11:
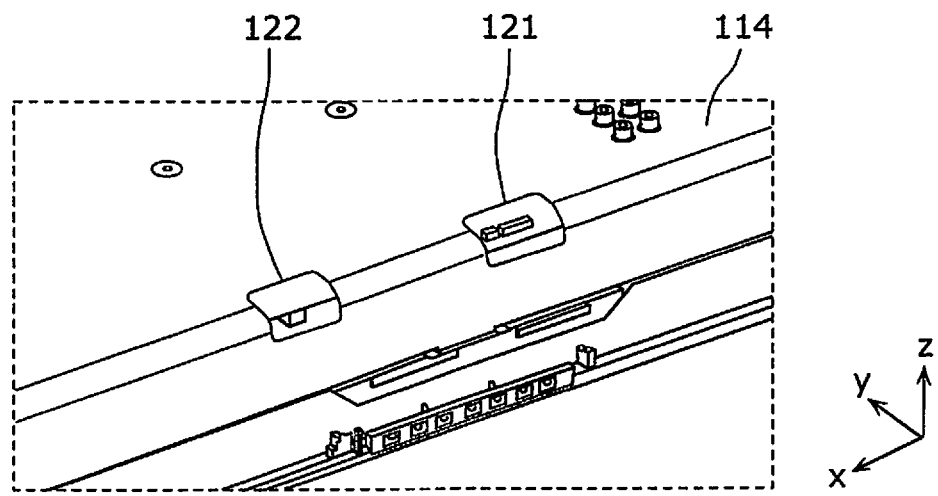
FIG. 11 is a partial perspective view of the rear frame, illustrating openings as seen from the rear of the display device.
Figure 12:
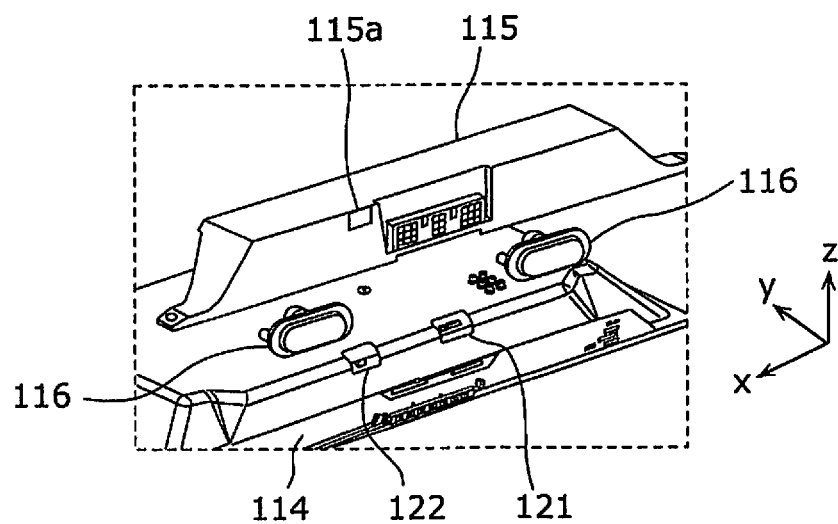
FIG. 12 is a partial perspective view of the rear frame and a speaker holder, illustrating a shielding of a cable by the speaker holder.

As shown in FIG. 7, openings 121 and 122 (e.g., wiring holes) are provided to the rear frame 114. The openings 121 and 122 are used for wiring of the audio/video processing board 111 and the power supply circuit board 112, respectively. The opening 121 is a hole for routing the cable that connects the audio/video processing board 111 and the relay board 105 to the outside from the interior of the rear frame 114. The opening 122 is a hole for routing the power cable connected to the power supply circuit board 112 from the interior of the rear frame 114 to the outside. FIG. 11 is a partial perspective view of the rear frame 114 illustrating the openings 121 and 122 as seen from the rear of the display device 100. The rear frame 114 forms an aesthetic part of the display device 100. Accordingly, the cable coming out of the opening 121 is hidden or shielded such that it cannot be seen from the rear of the display device 100. As shown in FIG. 12, the speaker holder 115 attached to the rear frame 114 hides or shields the openings 121 and 122. That is, after the audio/video processing board 111 and the relay board 105 have been connected by the cable, the speaker holder 115 is attached to the rear frame 114. An opening 115*a* for routing the power cable coming out of the opening 122 to the outside is provided to the speaker holder 115.

Figure 13:
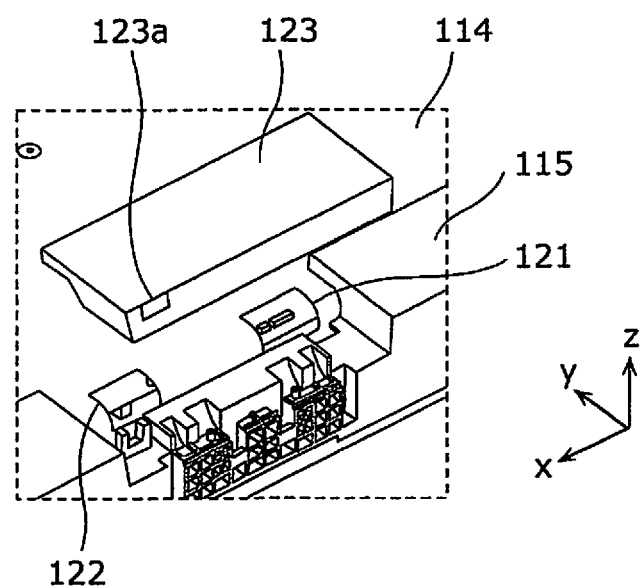
FIG. 13 is a partial perspective view of the rear frame and the speaker holder, illustrating a shielding of the cable by a cable cover.

Rather than hiding or shielding the cable with the speaker holder 115, the cable can also be hidden or shielded by a cable cover 123 as shown in FIG. 13. The cable cover 123 is attached to the rear frame 114, just as is the speaker holder 115. An opening 123*a* for routing the power cable coming out from the opening 122 to the outside is provided to the cable cover 123.

As described above, in the illustrated embodiment, the power supply circuit board 112 is disposed in the interior of the metal rear frame 114. Accordingly, even if the power supply circuit board 112 should catch fire, this structure makes it unlikely that the flames will shoot out from the rear frame 114. Also, since the power supply circuit board 112 cannot be seen from the rear of the display device 100, a plastic rear cover for covering the power supply circuit board 112 from rear can be eliminated. Furthermore, a separate metal panel just for covering the power supply circuit board 112 from the side or rear can also be eliminated. Accordingly, the display device 100 can be provided that has excellent fireproof performance, is thin and lightweight, and can be manufactured inexpensively.

Also, the audio/video processing board 111 is disposed in the interior of the metal rear frame 114. Since the audio/video processing board 111 cannot be seen from the rear of the display device 100, a plastic rear cover for covering the audio/video processing board 111 from rear can be eliminated.

Also, the power supply circuit board 112 is attached to the lower part of the rear frame 114. Accordingly, the power cable connected to the power supply circuit board 112 is easier to route out from the lower part of the display device 100.

Second Embodiment

Figure 14:
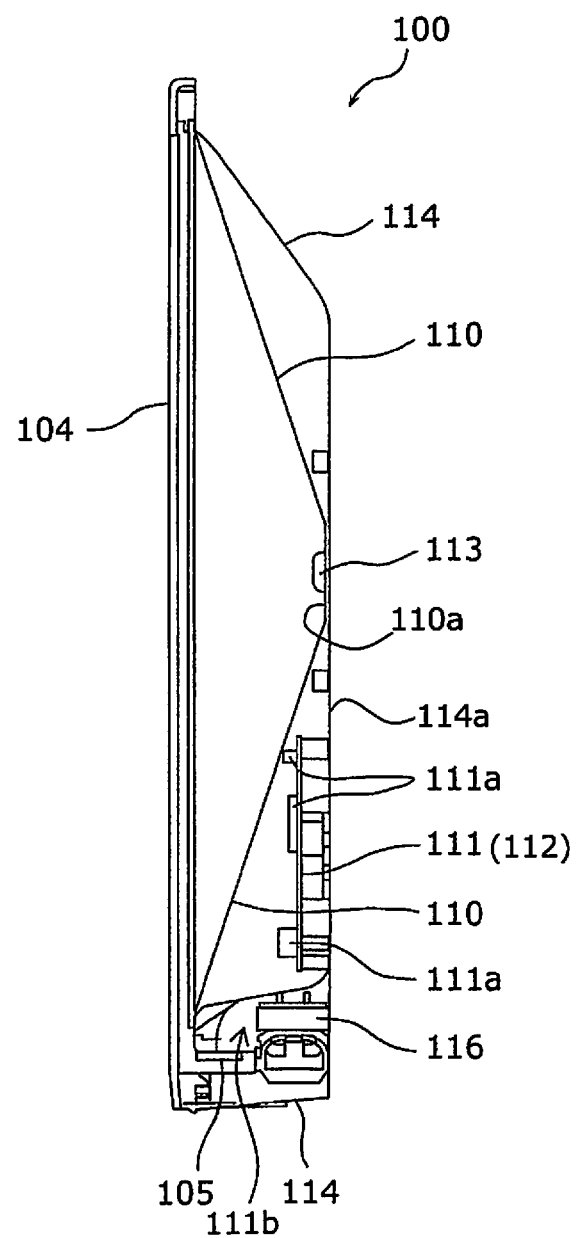
FIG. 14 is a cross sectional view of a display device in accordance with a second embodiment.

Referring now to FIG. 14, a display device 100 in accordance with a second embodiment will now be explained. In view of the similarity between the first and second embodiments, the parts of the second embodiment that are functionally identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, as shown in FIG. 3, the relay board 105 and the speaker 116 are disposed on the outside of the rear frame 114. The relay board 105 and the speaker 116 are covered by the speaker holder 115. On the other hand, in the second embodiment, as shown in FIG. 14, the relay board 105 and the speaker 116 are disposed on the inside of the rear frame 114. The speaker holder 115 is eliminated. Everything else is the same as in the second embodiment, and therefore will not be described again in detail.

FIG. 14 is a cross sectional view of the display device 100 at the same location as FIG. 3.

With the display device 100 in accordance with the second embodiment, the rear frame 114 has a shape that covers the lower part of the display device 100. The relay board 105 and the speaker 116 are attached in the gap between the reflector sheet 110 and the rear frame 114. Specifically, the speaker 116 is at least partially disposed within the gap portion 111*b* (e.g., the housing space) inside the rear frame 114. The relay board 105 and the speaker 116 can be attached to the rear frame 114 with screws or other such fastening members, for example.

Slits can be provided to the rear frame 114 near the sound outlet of the speaker 116. This makes it easier for sound outputted from the speaker 116 to be transmitted to the outside.

With the display device 100 in accordance with the second embodiment, the audio/video processing board 111 and the speaker 116 can both be disposed inside the rear frame 114. Accordingly, a separate speaker holder for supporting the speaker 116 can be eliminated. This makes the display device 100 thinner and lighter, and allows it to be manufactured more inexpensively. It also facilitates wiring the audio/video processing board 111 and the speaker 116 together.

Furthermore, the relay board 105 can be disposed on the inside the rear frame 114. Accordingly, a separate speaker holder for hiding the cable that connects the audio/video processing board 111 and the relay board 105 can be eliminated. This makes the display device 100 thinner and lighter, and allows it to be manufactured more inexpensively. It also facilitates wiring the audio/video processing board 111 and the relay board 105 together.

The display devices 100 in accordance with the first and second embodiments are described above, but the present invention is not limited to or by these embodiments.

For example, in the illustrated embodiments, a liquid crystal display device or a liquid crystal television set is used as an example of a display device, but the display device is not limited to these. For instance, the display device can be an organic EL (electroluminescence) display device, or can be an organic EL television set.

Also, the audio/video processing board 111 can be connected not only to the relay board 105 and the speaker 116, but also to a switch board having a switch operated by the user. In this case, the switch board can be disposed between the rear frame 114 and the speaker holder 115, or it can be disposed inside the rear frame 114.

The present invention can be applied to reproduction devices such as a liquid crystal display device or a liquid crystal television set.

In the illustrated embodiments, the display device includes the display cell, the metal housing, the light source, the reflecting member, and the power supply circuit board. The housing supports the display cell from a rear side of the display device. The light source is attached to the housing. The light source is configured to emit light toward the display cell. The reflecting member is disposed between the display cell and the housing. The reflecting member is configured to reflect the light emitted from the light source toward the display cell. The power supply circuit board is disposed between the reflecting member and the housing.

With this configuration, the power supply circuit board is disposed in the interior of the metal housing. Thus, even if the power supply circuit board should catch fire, this structure makes it unlikely that the flames will shoot out from the housing. Also, since the power supply circuit board cannot be seen from the rear of the display device, a separate rear cover for covering the power supply circuit board can be eliminated. Furthermore, a separate panel for covering the power supply circuit board from the side or rear can also be eliminated. Accordingly, the display device can be provided that has excellent fireproof performance, is thin and lightweight, and can be manufactured inexpensively.

In the illustrated embodiments, the display device can further includes the audio processing board for audio signal processing. The audio processing board is disposed between the reflecting member and the housing.

With this configuration, the audio processing board is disposed in the interior of the metal housing. Thus, the rear cover for covering the audio processing board can be eliminated because the audio processing board cannot be seen from the rear of the display device.

Also, in the illustrated embodiments, the display device can further include the speaker electrically coupled to the audio processing board. The speaker is disposed between the reflecting member and the housing.

With this configuration, the audio processing board and the speaker can both be disposed in the interior of the housing. Thus, a speaker holder for supporting the speaker can be eliminated. This allows the display device to be thinner and lighter, and lowers its manufacturing cost. It will also be easier to wire the audio processing board and the speaker together.

Also, in the illustrated embodiments, the display device can further include the video processing board for video signal processing. The video processing board is disposed between the reflecting member and the housing.

With this configuration, the video processing board is disposed in the interior of the metal housing. Thus, the rear cover for covering the video processing board can be eliminated because the video processing board cannot be seen from the rear of the display device.

Also, in the illustrated embodiments, the display device can further include the relay board that is configured to relay video signals outputted from the video processing board to the display cell. The relay board is electrically connected to the video processing board and to the display cell. The relay board is disposed between the reflecting member and the housing.

With this configuration, the video processing board and the relay board can both be disposed in the interior of the housing. Thus, the speaker holder for hiding the cable that connects the video processing board and the relay board can be eliminated. This allows the display device to be thinner and lighter, and lowers its manufacturing cost. It will also be easier to wire the video processing board and the relay board together.

Also, in the illustrated embodiments, the display device can further include a plurality of studs disposed on the housing. The power supply circuit board is fastened to the studs with a plurality of fastening members.

With this configuration, the rear of the display device will be more aesthetically pleasing than when fastening member receptacles are formed by drawing or the like.

Also, in the illustrated embodiments, the power supply circuit board can be attached to the lower part of the housing.

With this configuration, a power cable connected to the power supply circuit board can be more easily routed out from the lower part of the display device.

In the illustrated embodiments, the power supply circuit board is fixedly attached to a rear face of the housing inside the housing.

In the illustrated embodiments, the reflecting member is configured such that a distance between the reflecting member and a rear face of the housing increases as moving towards a lower end of the display device to define a housing space between the reflecting member and the housing. The power supply circuit board is disposed within the housing space inside the housing.

In the illustrated embodiment, the display device includes a speaker at least partially disposed within the housing space inside the housing.

In the illustrated embodiments, the reflecting member has a bottom portion that is disposed on the rear face of the housing. The power supply circuit board is disposed on a front side of the display device relative to the bottom portion of the reflecting member.

In the illustrated embodiment, the housing has a wiring hole for wiring of the power supply circuit board.

With the display devices in accordance with the illustrated embodiments, a display device can be provided that has excellent fireproof performance, is thin and lightweight, and can be manufactured inexpensively.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
   a display cell;
   a metal housing supporting the display cell from rearward of the display device;
   a light source attached to the housing, the light source emitting light toward the display cell;
   a reflecting member disposed between the display cell and the housing, the reflecting member reflecting the light emitted from the light source toward the display cell, the reflecting member having a bottom portion to which the light source is arranged and an inclined portion that is inclined relative to the bottom portion; and
   a power supply circuit board disposed rearward of the display device relative to the inclined portion between the inclined portion and the housing.

2. The display device according to claim 1, further comprising
   an audio processing board for audio signal processing disposed between the reflecting member and the housing.

3. The display device according to claim 2, further comprising
   a speaker electrically connected to the audio processing board, the speaker being disposed between the reflecting member and the housing.

4. The display device according to claim 1, further comprising
   a video processing board for video signal processing disposed between the reflecting member and the housing.

5. A display device comprising:
   a display cell:
   a metal housing supporting the display cell from rearward of the display device;
   a light source attached to the housing, the light source emitting light toward the display cell;
   a reflective member disposed between the display cell and the housing. the reflecting member reflecting the light emitted from the light source toward the display cell;
   a power supply circuit board disposed between the reflecting member and the housing;
   a video processing board for video signal processing disposed between the reflecting member and the housing; and
   a relay board that relays video signals outputted from the video processing board to the display cell, the relay board being electrically connected to the video processing board and to the display cell, the relay board being disposed between the reflecting member and the housing.

6. The display device according to claim 1, further comprising
   a plurality of studs disposed on the housing,
   the power supply circuit board being fastened to the studs with a plurality of fastening members.

7. The display device according to claim 1, wherein
   the power supply circuit board is attached to a lower part of the housing.

8. The display device according to claim 1, wherein
   the power supply circuit board is fixedly attached to a rear face of the housing inside the housing.

9. The display device according to claim 1, wherein
a distance between the reflecting member and a rear face of the housing increases as moving towards a lower end of the display device to define a housing space between the reflecting member and the housing, and
the power supply circuit board is disposed within the housing space inside the housing.

10. The display device according to claim 9, further comprising
a speaker at least partially disposed within the housing space inside the housing.

11. The display device according to claim 1, wherein
the reflecting member has a bottom portion that is disposed on a rear face of the housing, and
the power supply circuit board is disposed on a front side of the display device relative to the bottom portion of the reflecting member.

12. The display device according to claim 1, wherein
the housing has a wiring hole for wiring of the power supply circuit board.

* * * * *